US011251956B2

(12) United States Patent
Young

(10) Patent No.: US 11,251,956 B2
(45) Date of Patent: Feb. 15, 2022

(54) FEDERATED BLOCKCHAIN IDENTITY MODEL AND SECURE PERSONALLY IDENTIFIABLE INFORMATION DATA TRANSMISSION MODEL FOR RCS

(71) Applicant: Avaya Inc., Santa Clara, CA (US)

(72) Inventor: John A. Young, Buntingford (GB)

(73) Assignee: Avaya Inc., Santa Clara, CA (US)

( * ) Notice: Subject to any disclaimer, the term of this patent is extended or adjusted under 35 U.S.C. 154(b) by 544 days.

(21) Appl. No.: 16/025,090

(22) Filed: Jul. 2, 2018

(65) Prior Publication Data

US 2020/0007333 A1 Jan. 2, 2020

(51) Int. Cl.
*H04L 9/06* (2006.01)
*H04L 9/32* (2006.01)
(Continued)

(52) U.S. Cl.
CPC .......... *H04L 9/3213* (2013.01); *H04L 9/0643* (2013.01); *H04L 9/3231* (2013.01);
(Continued)

(58) Field of Classification Search
CPC ... H04L 9/3213; H04L 9/0643; H04L 9/3231; H04L 9/3234; H04L 9/3271; H04L 9/3236; H04L 9/3247; H04L 63/0861; H04L 63/123; H04L 67/10; G06F 21/32; G06F 21/44
See application file for complete search history.

(56) References Cited

U.S. PATENT DOCUMENTS 10,164,977 B2 * 12/2018 Ezell .................... H04L 63/0861
10,248,783 B2 * 4/2019 Costa Faidella ...... H04L 9/3234
(Continued)

FOREIGN PATENT DOCUMENTS

EP 2706727 3/2014
JP 2007-257500 10/2007
(Continued)

OTHER PUBLICATIONS

Extended Search Report for European Patent Application No. 19183154.4, dated Nov. 12, 2019 9 pages.
(Continued)

*Primary Examiner* — Paul E Callahan
(74) *Attorney, Agent, or Firm* — Sheridan Ross P.C.

(57) ABSTRACT

According to one embodiment, providing identity authentication can comprise registering, by an identity server, Proof Of Identity (POI) information in an identity record for a user of a Rich Communications Services (RCS) network in a secure store and a hash of an identity claim token for the user in an identity management blockchain. The identity server can receive a request to authenticate the user and, in response to the request, provide an encrypted identity claim token for the user. The encrypted identity claim token can comprise an attestation of a certifying authority and, when decrypted and hashed can match the hash of an identity claim token in the identity management blockchain when the user is authentic. An authentication score indicating a degree to which received biometric data of the user and device data matches a set of baseline biometric and device date can also be provided in response to the request.

18 Claims, 6 Drawing Sheets

(51) Int. Cl.
*H04W 12/06* (2021.01)
*H04L 29/08* (2006.01)

(52) U.S. Cl.
CPC .......... *H04L 9/3234* (2013.01); *H04L 9/3271* (2013.01); *H04W 12/06* (2013.01); *H04L 67/10* (2013.01)

(56) References Cited

U.S. PATENT DOCUMENTS

| | | | | |
|---|---|---|---|---|
| 2011/0247055 | A1* | 10/2011 | Guo | G06F 21/34 726/4 |
| 2017/0344988 | A1* | 11/2017 | Cusden | G06F 21/00 |
| 2018/0183587 | A1* | 6/2018 | Won | H04L 9/0891 |
| 2018/0183740 | A1 | 6/2018 | Werdell et al. | |
| 2019/0158487 | A1* | 5/2019 | Hayes | H04W 12/06 |

FOREIGN PATENT DOCUMENTS

| | | |
|---|---|---|
| KR | 10-1829730 | 3/2018 |
| KR | 10-1851261 | 4/2018 |
| KR | 10-2018-0054530 | 5/2018 |

OTHER PUBLICATIONS

Official Action for India Patent Application No. 201914025686, dated Nov. 5, 2020 6 pages.
Official Action with English Translation for Japan Patent Application No. 2019-123410, dated Oct. 27, 2020 8 pages.
Official Action with English Translation for Korea Patent Application No. 2019-0079654, dated Sep. 17, 2020 13 pages.
Intention to Grant for European Patent Application No. 19183154.4, dated Jun. 29, 2021, 45 pages.
Decision to Grant with English Translation for Japan Patent Application No. 2019-123410, dated Jul. 6, 2021.
Official Action with English Translation for Korea Patent Application No. 2019-0079654, dated Jul. 1, 2021, 6 pages.
Notice of Allowance with English Translation for Korea Patent Application No. 2019-0079654, dated Oct. 18, 2021, 3 pages.

* cited by examiner

FEDERATED BLOCKCHAIN IDENTITY MODEL AND SECURE PERSONALLY IDENTIFIABLE INFORMATION DATA TRANSMISSION MODEL FOR RCS

FIELD OF THE DISCLOSURE

Embodiments of the present disclosure relate generally to methods and systems for authenticating a user and more particularly to using an identity management blockchain and secure personally identifiable information to authenticate users in a Rich Communications Services (RCS) network.

BACKGROUND

Rich Communication Services (RCS) is a global initiative that promotes the deployment of inter-operator mobile services within an industry ecosystem. It is a communication protocol for use between mobile-carriers, and between phones and mobile-carriers. It is aimed at replacing traditional SMS messaging with a next generation text-messaging capability that is richer and can transmit in-call multimedia. The emergence of RCS was a response by the mobile operators to combat a competitive situation, whereby "Over the Top" providers were offering high value services over incumbent carrier networks. The RCS feature-set includes: Standalone Messaging, 1-to-1 Chat, Group Chat, File Transfer, Content Sharing, Social Presence Information, IP Voice call, Best Effort Video call, Geolocation Exchange, Audio Messaging, Network based blacklist and Capability Exchange based on Presence or SIP OPTIONS. VoLTE (Voice over Long-Term Evolution) essentially provides the underlying wireless network infrastructure upon which Rich Communications Services (RCS) can be deployed.

However, there are a number of acknowledged security vulnerabilities in RCS networks. For example, authentication in RCS services on an individual device is currently done with a solution based on username/password combination. There is a risk that these credentials can be hijacked by a malware application and used for spoofing identities.

In another example, user authentication is performed via basic or digest access authentication based on credentials (user name and password) exchanged between the application and the peer network application. Automatic provisioning of the credentials is applied via device provisioning. The digest procedure in itself is secure and robust against attacks. However, it is vulnerable to attacks to discover the credentials via access to the application's key store or spoofing attacks based on the credential management procedure (e.g. malware pretending to be an RCS application where client authenticity is not verified).

RCS also supports network-based user identification (e.g. via "header enrichment") which is in fact a Single-Sign-On (SSO) prolonging the authentication of the user at the time of bearer set-up for the usage of services within the bearer session. The bearer set-up in a 3GPP network is typically based on the SIM-based Authentication and Key Agreement protocol. The IP address assigned at the time of bearer set-up is used as the criteria to identify the user within the existing bearer session. RCS service providers need to take precautions in securing the trusted network access to prevent fraudulent IP address claims. This mechanism is insecure since attackers are able to gain unauthorized access to the network services once they got the permission to use a bearer session on behalf of the user.

RCS utilizes user-based authentication via One-Time Password (OTP), whereby the user or the device claims an identity which is challenged via a signaling transaction over a channel with an authentication context for this identity, e.g. the short message service to another device or an external secure token service. Based on the one-time authentication a long-term authentication context can be generated (SSO) to prevent the need for subsequent authentication transactions. This security measure may be used as an additional measure for another authentication mechanism, e.g. based on the principle of the two-factor authentication, which comes in most cases with user impact. single token exchange via OTP is secure in itself. However, it is vulnerable to spoofing attacks to gain access to the token used to authenticate the access. The use of an SMS message for OTP authentication is not inherently secure.

Thus, the risk that third-party applications are able to retrieve user data or to make use of communication services on behalf of the user persists. The main RCS vulnerability comes from the fact that user identification and authentication data is made available to consumers via a device management technology with weak security measures. Hence, there is a need for improved methods and systems for authenticating a user of an RCS network or service.

BRIEF SUMMARY

Embodiments of the disclosure provide systems and methods for using an identity management blockchain and secure personally identifiable information to authenticate users in a Rich Communications Services (RCS) network. Such a model can significantly improve the deployment and interoperability of RCS authentication services amongst an ecosystem of RCS mobile providers. All of the participating RCS mobile providers can gain common access to the same immutable "proof-of-identity" information that uniquely exists for each RCS user.

According to one embodiment, a method for providing identity authentication can comprise registering, by an identity server, Proof Of Identity (POI) information in an identity record for a user of a Rich Communications Services (RCS) network in a secure store and a hash of an identity claim token for the user in an identity management blockchain. Registering the POI information in an identity record for the user can comprise receiving, by the identity server from a device of the user, one or more RCS network credentials, one or more identity claims, device information uniquely identifying the device of the user and/or Personally Identifiable Information (PII) for the user. The POI information for the user can be stored in the identity record for the user in an encrypted form. Certification of the identity claims from the user can be obtained by the identity server from a certification authority. Additionally, or alternatively, a set of baseline biometric data for the user can be received by the identity server from the device of the user. The set of baseline biometric data for the user can also be stored in an encrypted form. A hash of an identity claims token received from the certification authority and representing attestation of the certifying authority to the identity claim for the user can then be generated by the identity server and the hash of the identity claims token for the user can be written by the identity server to the identity management blockchain.

A request to authenticate the user can then be received by the identity server. In response to the request, the identity server can provide identity information for the user. The identity information can comprise one or more encrypted identity claims tokens for the user. According to one embodiment, providing the one or more encrypted identity claims tokens for the user can further comprise receiving, from the device of the user, biometric data and device data, determining whether the received biometric data and device data matches data in the set of baseline biometric data for the user and the device information stored in the identity record for the user, and in response to the received biometric data and device data matching the data in the set of baseline biometric data for the user and the device information stored in the identity record for the user, unlocking, by the identity server, the one or more encrypted identity claims tokens and/or encrypted PII for the user. Additionally, or alternatively, providing the one or more encrypted identity claims tokens and/or encrypted PII for the user can comprise generating an authentication score indicating a degree to which the received biometric data and device data matches data in the set of baseline biometric data for the user and the device information stored in the identity record for the user and providing the authentication score in response to the request.

According to another embodiment, a method for authenticating a user can comprise receiving, by a mobile carrier system from a device of the user, a request for a service, providing, by the mobile carrier system to the device of the user, an authentication challenge in response to the request for service, and receiving, by the mobile carrier system, from the device of the user, and in response to the authentication challenge, an address of an identity management blockchain comprising a hash of an identity claim token for the user, a symmetric key, and an address of an identity server wherein the one or more encrypted identity tokens can be retrieved and/or one or more addresses where encrypted PII data can be retrieved. The mobile carrier system can then request an identity claim token for the user from the identity server at the address received from the device of the user.

An encrypted identity claim token for the user can be received by the mobile carrier system from the identity server in response to the request. Using the symmetric key received from the device of the user, the mobile carrier system can decrypt the received encrypted identity claim token, decrypt the encrypted identity claim token and/or PII data, if any, using the symmetric key, and determining whether a hash of the decrypted identity claim token matches the hash of the identity claim token for the user in the identity management blockchain. In response to the hash of the decrypted identity claim token matching the hash of the identity claim token for the user in the identity management blockchain the mobile carrier system can provide the requested service to the device of the user. In some cases, the mobile carrier system can receive from the identity server an authentication score generated by the identity server based on a comparison of a current set of device information from the device of the user and current biometric information for the user to previously registered device information and biometric information. In such cases, the mobile carrier system can apply one or more security policies defining a threshold value for the authentication score and providing the requested service can be further based on a result of applying the one or more security policies.

According to yet another embodiment, a system can comprise an identity server comprising a processor and a memory coupled with and readable by the processor and storing therein a set of instructions which, when executed by the processor, causes the processor to provide identity authentication by registering Proof Of Identity (POI) information in an identity record for a user of a Rich Communications Services (RCS) network in a secure store and a hash of an identity claim token for the user in an identity management blockchain. The system can also comprise a mobile carrier system comprising a processor and a memory coupled with and readable by the processor and storing therein a set of instructions which, when executed by the processor, causes the processor to authenticate the user when requesting services by receiving, from the device of the user, a request for a service, providing, to the device of the user, an authentication challenge in response to the request for service, receiving, from the device of the user, and in response to the authentication challenge, an address to the identity management blockchain, a symmetric key, and an address of the identity server, and requesting from the identity server at the address received from the device of the user, the identity claim token for the user.

The instructions executed by the processor of the identity server can further cause the processor to receive, from the mobile carrier system, the request for the identity claim token of the user and provide, to the mobile carrier system, in response to the request, the encrypted identity claim token for the user. The encrypted identity claim token can comprise an attestation of a certifying authority to an identity claim by the user.

The instructions executed by the processor of the mobile carrier system can further cause the processor to receive, from the identity server, the encrypted identity claim token for the user in response to the request, decrypt the received encrypted identity claim token using the symmetric key received from the device of the user, generate a hash of the decrypted identity claim token using the symmetric key received from the device of the user, determine whether the generated hash of the decrypted identity claim token matches the hash of the identity claim token for the user in the identity management blockchain, and provide to the device of the user, the requested service in response to the generated hash of the decrypted identity claim token matching the hash of the identity claim token for the user in the identity management blockchain.

Registering the POI information in an identity record for the user further can comprises receiving, from a device of the user, one or more RCS network credentials, one or more identity claims, device information uniquely identifying the device of the and/or Personally Identifiable Information (PII) for the user and storing the POI information for the user in the identity record for the user in an encrypted form. The instructions executed by the processor of the identity server can further cause the processor to obtain certification of the identity claims provided by the user from a certification authority. Additionally, or alternatively, the instructions executed by the processor of the identity server can further cause the processor to receive, from the device of the user, a set of baseline biometric data for the user, and store the set of baseline biometric data for the user in an encrypted form.

The instructions executed by the processor of the identity server can further cause the processor to, prior to providing the encrypted identity claim token for the user to the mobile carrier system, receive, from the device of the user, biometric data and device data, determine whether the received biometric data and device data matches data in the set of baseline biometric data for the user and the device information stored in the identity record for the user, and in response to the received biometric data and device data matching the data in the set of baseline biometric data for the user and the device information stored in the identity record for the user, unlock the identity record for the user. In some cases, providing, in response to the received request, the encrypted identity claim token for the user can further comprise generating an authentication score indicating a degree to which the received biometric data and device data matches data in the set of baseline biometric data for the user and the device information stored in the identity record for the user and providing the authentication score in response to the request. In such cases, the instructions executed by the processor of the mobile carrier system can further cause the processor to receive, from the identity server, an authentication score generated by the identity server based on a comparison of a current set of device information from the device of the user and current biometric information for the user to previously registered device information and biometric information, and apply one or more security policies defining a threshold value for the authentication score, wherein providing the requested service is further based on a result of applying the one or more security policies. In one implementation, the mobile carrier system can comprise a system of a mobile carrier network, the device of the user can comprise a mobile device, and the request for service can comprise a request for RCS network access.

Figure 1:
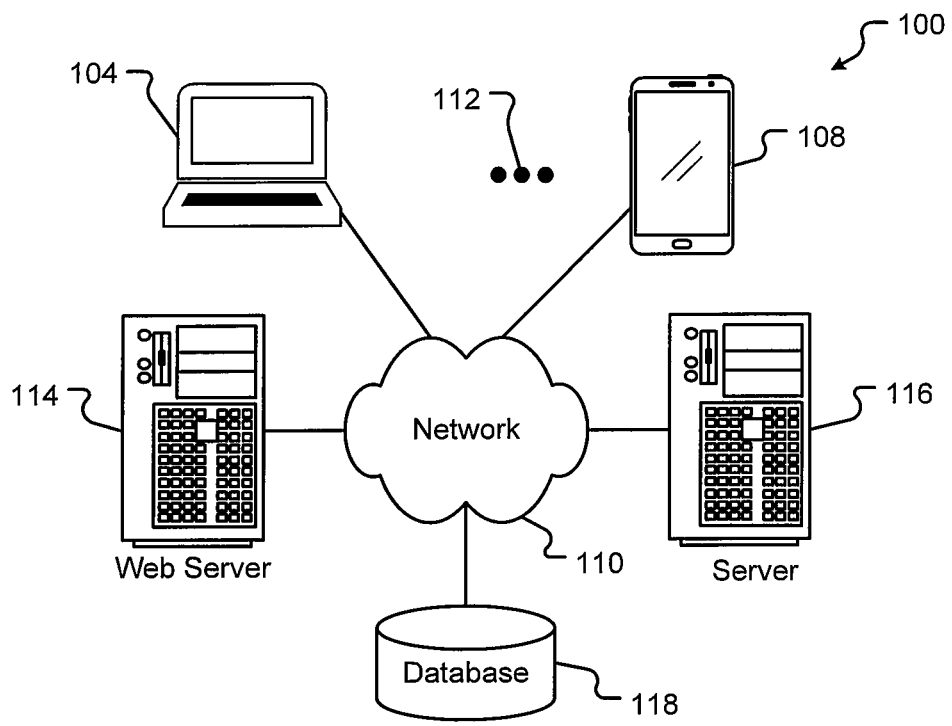
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIVI926EJS™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation SIP, TCP/IP, SNA, IPX, AppleTalk, and the like. Merely by way of example, the network 110 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP (Session Initiation Protocol) servers, HTTP(s) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a storage-area network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
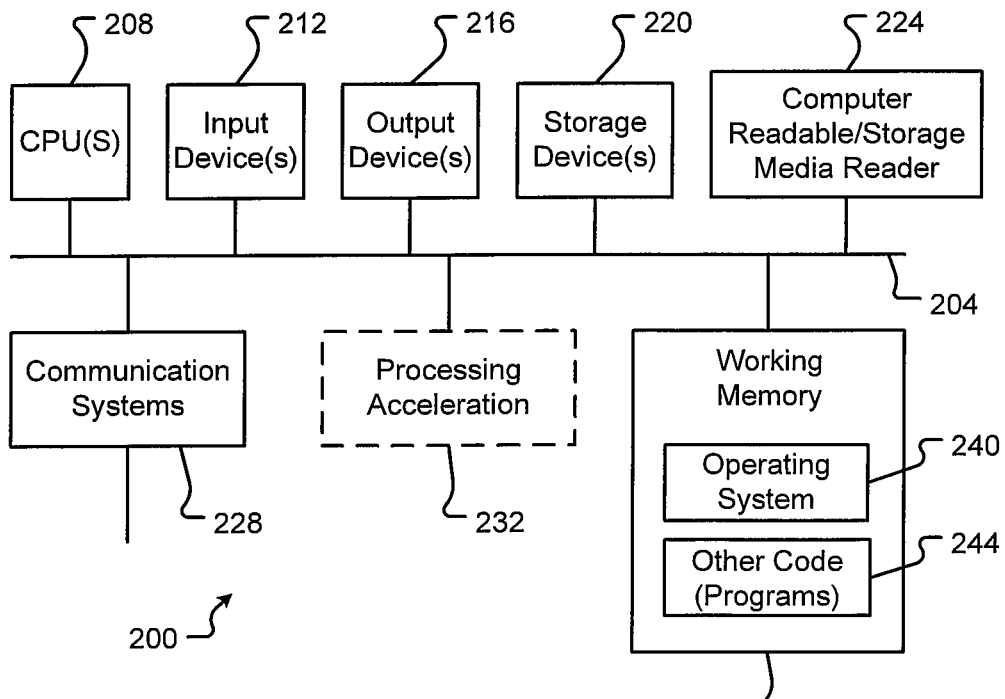
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

According to one embodiment, the systems and devices described above can be used to implement a Rich Communication Services (RCS) network. Blockchain technology can be deployed to realize a distributed and highly secure identity model for RCS network users. Blockchain can support a permanent, transparent and secure Proof-of-Identity (POI) model for each RCS network user. This same model can support the secure digital transmission of the RCS user's network credentials to counterparties with whom the user intends to undertake digital transactions. Such a model can significantly improve the deployment and interoperability of RCS authentication services amongst an ecosystem of RCS mobile providers. All of the participating RCS mobile providers can gain common access to the same immutable "proof-of-identity" information that uniquely exists for each RCS user.

As known in the art, a blockchain is a distributed database/ledger technology that maintains a continuously-growing list of ordered blocks. A distributed ledger is a type of database that is shared, replicated, and synchronized amongst all members in the network. Participants in the network govern and agree by consensus on the updates to the ledger. No centralized authority is involved. Blockchains typically store mathematical hashes (e.g. SHA-256) of transactional data rather than the original transactional information. Hashed transaction records are grouped together to form individual blocks that are immutably/permanently stored on the Blockchain. Blocks are inextricably linked together such that even the slightest attempt to tamper with the contents of a previous block will invalidate all of the hashes.

According to one embodiment, and as will be described in greater detail below, providing identity authentication using such a model can comprise registering, by an identity server, Proof Of Identity (POI) information in an identity record for a user of a RCS network in a secure store and a hash of an identity claim token for the user in an identity management blockchain. The identity server can receive a request to authenticate the user and, in response to the request, provide encrypted identity information for the user. The encrypted identity information can comprise one or more encrypted identity claim tokens for the user. The authenticating party can then decrypt and hash the identity claim token provided by the identity server using a previously agreed hashing algorithm or one identified to the authenticating party by the identity server. This hash of the decrypted identity claim token will match the hash of identity claim token in the identity management blockchain when the user is authentic.

Figure 3:
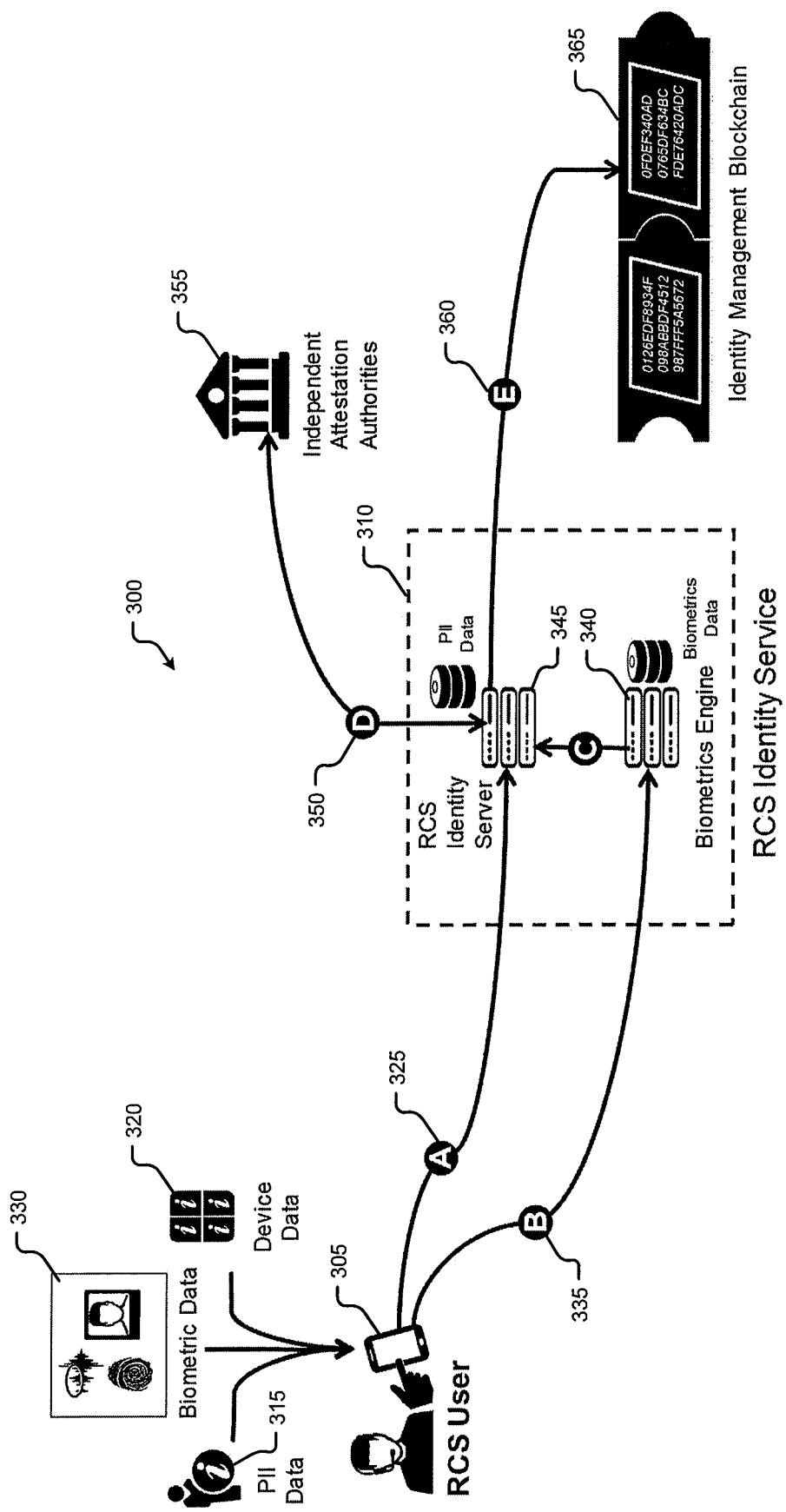
FIG. 3 is a block diagram illustrating elements of a system for registering an identity according to one embodiment of the present disclosure.

FIG. 3 is a block diagram illustrating elements of a system for registering an identity according to one embodiment of the present disclosure. As illustrated in this example, the system 300 can comprise a user device 305 such as a mobile device and an RCS identity service comprising one or more servers or other computers as also described above. The user device 305 and identity service 310 can communicate over one or more networks (not shown here), such as a mobile network, the Internet, and/or other networks as described above.

According to one embodiment, each RCS user would undergo a registration process whereby multiple types of POI data 315, some optional in nature, can be provided 325 to an identity server 345 of the identity service 310 through the user device 305 to form the basis of the user's "Proof-of-Identity." For example, this information can include, but is not limited to, a user name and password, user identification data, special question(s)/answer(s), etc. Generally, the POI information 315 provided can be information that the user intends to use during downstream interactions with different organizations/enterprises. Device data 320 can also be provided 325 to the identity server 345. The device data 320 can comprise, for example, a device serial number, SIM data, and/or other one or more other types of data that may be used as a device "fingerprint" that uniquely identifies the RCS user's device 305.

According to one embodiment, biometric data 330 for the user can also be collected through the user device 305. If collected, such information can comprise a fingerprint, a voice sample, facial recognition sample, and/or other biometric samples. This information 330 can be provided 335 to a biometric engine 340 of the identity service 310. If provided, this biometric information 330 can be used as a baseline for comparison to biometric samples collected from the user when the user subsequently attempts to access services as will be described below.

According to one embodiment, the POI information collected by the identity server 345 can be independently certified 350 by one or more recognized attestation authorities 355. As known in the art, the attestation authorities can comprise one or more public or private sources such as a Department of Motor Vehicles (DMV), Social Security Administration, and/or other governmental or private authorities. Once obtained, the certification of POI information data provides confirmation of the user's identity and the provided POI information.

The identity server 345 can then tokenize the collected POI information and certified identity claim. Tokenization can be used to minimize the unnecessary sharing of POI information. For instance, rather than requiring the RCS user to provide their home address as proof of U.S residency, a token that attests to this fact can be provided. Such a token would have been independently certified by a trusted and authorized authority. To accomplish this, unhashed Proof-of-Identity (POI) information can be stored in encrypted format on the user's device 305 and within an identity record for the user maintained in the secure identity server 345. Thus, the RCS user would retain control over their identity information and the access to it by counterparties. A hash of a certificate or other identity claim token obtained from the attestation authority 355 can also be written 360 to an identity management blockchain 365 which can subsequently be used to authenticate a user as will be described below.

Multiple identity claim tokens for different identity information can be mathematically hashed and written to the identity management blockchain to serve as a permanent/immutable proof-of-identity. Individual POI identity hashes can include, but are not limited to:

IDH1—Hash of digital signature of RCS network credentials
IDH2—Hash of identity certificate for user's driving license
IDH3—Hash of identity certificate for user's identity card
IDH4—Hash of identity certificate for user's passport The Proof-of-Identity (POI) Record can be comprised of the individual identity hashes:

POI=*IDH*1+*IDH*2+*IDH*3+*IDH*4+Timestamp

The individual IDHx hashes can be securely written onto the identity management blockchain and can remain as an immutable and publicly auditable record by all parties on the blockchain.

Figure 4:
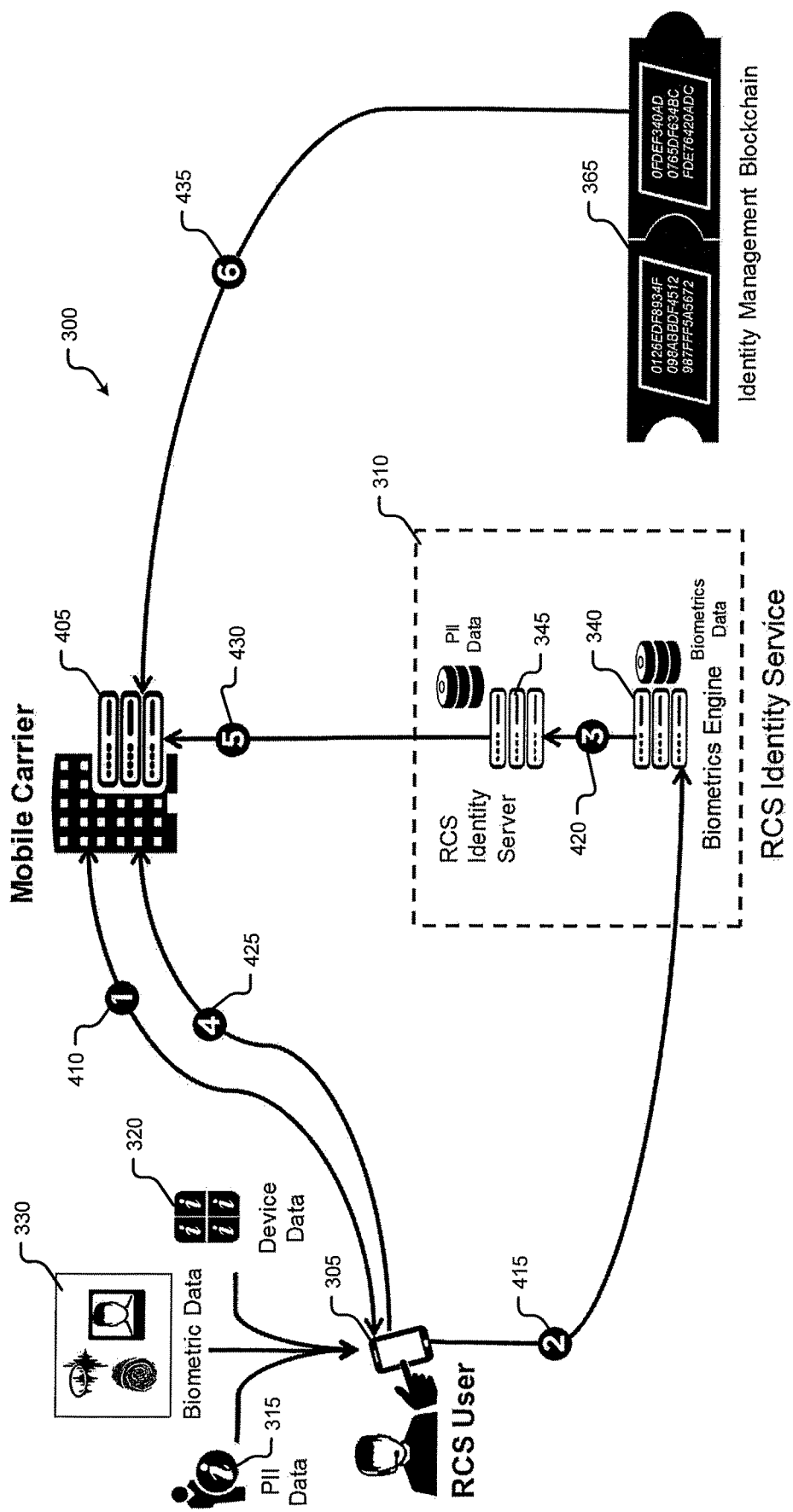
FIG. 4 is a block diagram illustrating elements of a system for authenticating an identity according to one embodiment of the present disclosure.

FIG. 4 is a block diagram illustrating elements of a system for authenticating an identity according to one embodiment of the present disclosure. More specifically, this example illustrates an access of a mobile carrier network 405 by the user device 305. To initiate this process, the user device and mobile carrier system 405 can exchange an authentication challenge 410. The user device 305 can also provide 415 a current biometric sample and current device fingerprint data to the identity service. When an RCS user undergoes network authentication, policies of that network can dictate the specific information that must be provided by the actual user. A basic form of authentication may only involve providing one or more biometrics. This sample can be compared to the baseline sample maintained by the biometrics engine 340 of the identity service. The new sample of the mobile device fingerprint retrieved from the device and then compared to the device fingerprint that was originally obtained during the registration process. If the biometric sample and device fingerprint information match the baseline information, the user's identity record can be unlocked 420.

The RCS user, through the user's device 305, can provide 425 to the mobile carrier a symmetric encryption key so that the Proof-of-Identity information that is stored on the Identity Server can be unencrypted. In some cases, the mobile device may also indicate a hashing algorithm to be used for generating a hash of identity claim tokens for the user. The user device can also provide 425 the identity management blockchain address and an address to the identity server 345, e.g., an address to the user's identity record. The mobile carrier 405 can then obtain from the identity server 345 encrypted RCS user name, password, any additional POI (Proof-of-Identity) record credentials and identity claim tokens 430 for the user. The mobile carrier 405 can then decrypt and hash the identity claim tokens obtained from the identity server 345, e.g., using the identified algorithm, and compare them with the corresponding hashes 435 it retrieves from the identity management blockchain 365. A positive match represents a fully authenticated identity and the user is allowed to proceed with using the RCS service.

Figure 5:
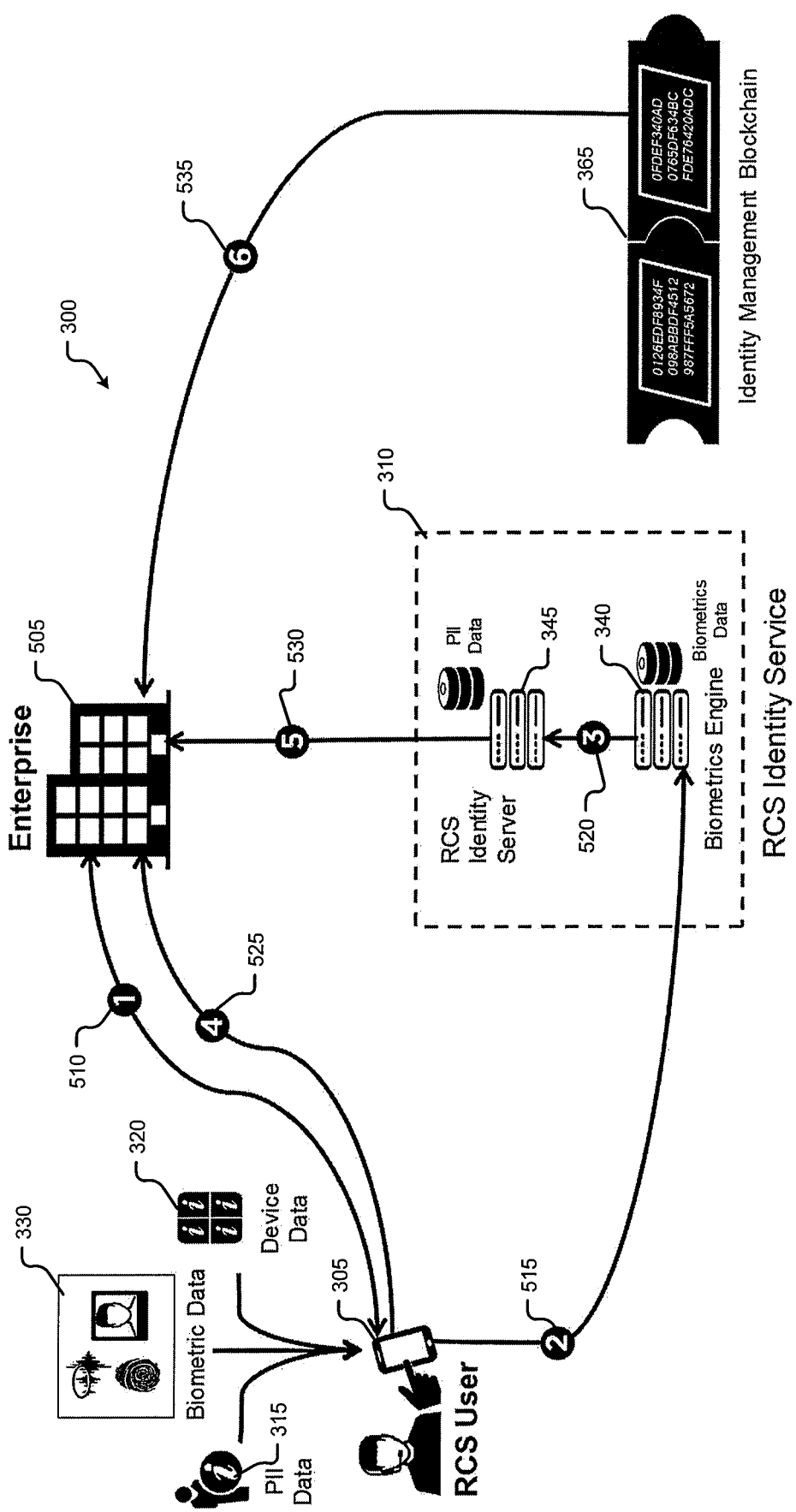
FIG. 5 is a block diagram illustrating elements of a system for authenticating an identity according to another embodiment of the present disclosure.

FIG. 5 is a block diagram illustrating elements of a system for authenticating an identity according to another embodiment of the present disclosure. More specifically, this example illustrates an access of an enterprise system 505 by the user device 305 such as in a consumer-to-business (C2B) implementation. To initiate this process, the user device 305 and enterprise system 505 can exchange an authentication challenge 510. The user device 305 can also provide 515 a current biometric sample and current device fingerprint data to the identity service. This sample can be compared to the baseline sample maintained by the biometrics engine 340 of the identity service. The new sample of the mobile device fingerprint retrieved from the device and then compared to the device fingerprint that was originally obtained during the registration process. If the biometric sample and device fingerprint information match the baseline information, the user's identity record can be unlocked 520.

The RCS user, through the user's device 305, can provide 525 to the enterprise system 505 a symmetric encryption key so that the Proof-of-Identity information that is stored on the identity server 345 can be unencrypted. In some cases, the mobile device may also indicate a hashing algorithm to be used for generating a hash of identity claim tokens for the user. The user device can also provide 525 the identity management blockchain address and an address to the identity server 345, e.g., an address to the user's identity record. The enterprise system 505 can then obtain from the identity server 345 encrypted RCS credentials and identity claim tokens 530. The enterprise system 505 can then decrypt and hash the identity claim tokens obtained from the identity server 345, e.g., using the identified algorithm, and compare the results with the corresponding hashes 535 it retrieves from the identity management blockchain 365. A positive match represents a fully authenticated identity and the user is allowed to proceed with accessing the services of the enterprise.

Figure 6:
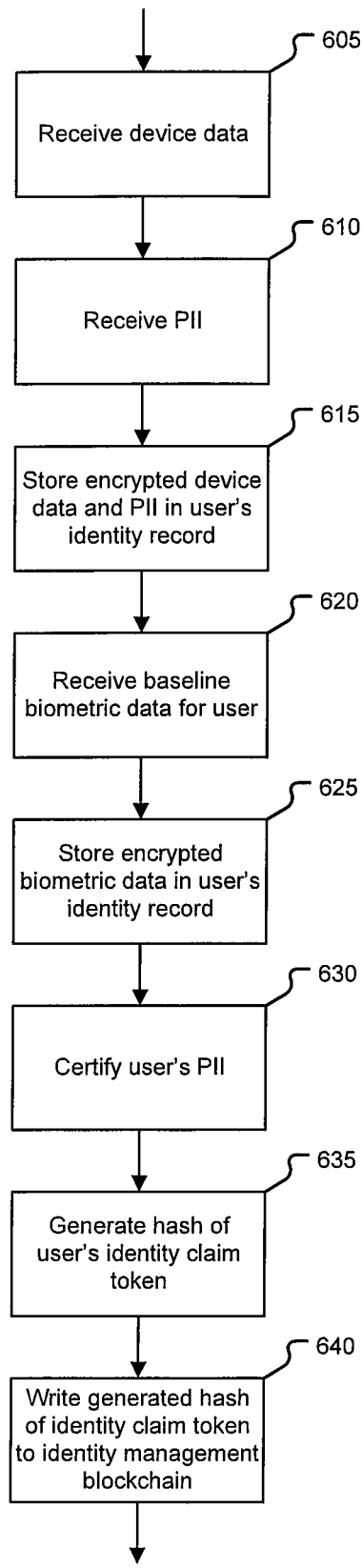
FIG. 6 is a flowchart illustrating an exemplary process for registering an identity according to one embodiment of the present disclosure.

FIG. 6 is a flowchart illustrating an exemplary process for registering an identity according to one embodiment of the present disclosure. As illustrated in this example, registering the POI information for the user can begin by receiving 605, from the device of the user, device information uniquely identifying the device. This information can include, but is not limited to, any one or more of a serial number of the device, a Universal Unique IDentifier (UUID) for the device, attributes of a web browser executing on the device, a combination of such identifiers, and/or other identifying information that can be used to uniquely identify the device. POI information for the user can also be received 610 from the device of the user. The POI information can comprise any information that the user may be asked to provide or choose to provide to the mobile carrier or other service provider. For example, the POI information can include, but is not limited to, the user's network username and/or password, the user's home address, the user's date of birth, a social security number, a driver's license number, bank account information, etc. The received device information and the POI information for the user can then be stored 615. According to one embodiment, the device information and POI information for the user can be stored in encrypted form in an identity record for the user.

In some cases, and according to one embodiment, a set of baseline biometric data for the user can also be received and stored 620 as part of the registration process. Such biometric information can include, but is not limited to, one or more fingerprints, a voice sample, a face picture or other facial recognition sample, an iris scan, a retina scan, and/or other uniquely identifiable biometric samples that can be obtained by a user device. The set of baseline biometric data, if any, can also be stored 625 in an encrypted form.

Certification of the POI information for the user can be obtained 630 from a certification authority. That is, the POI information provided from the user's device can be checked against public and/or private records to confirm its accuracy and/or validity. For example, Department of Motor Vehicle (DMV), Social Security Administration, and/or other governmental sources can be used to confirm or certify the POI information provided by the user through the user's device by returning an identity certificate or other identity claim token.

A hash of the identity claim token for the user can then be generated 635. That is, tokenization of the POI information can be used to minimize the unnecessary sharing of POI information. For instance, rather than requiring the user to provide their home address or other identifying information, a token that attests to this fact can be provided. A hash of the identity claim token for the user can then be written 640 to an identity management blockchain. In this way, multiple sources of identity information can be mathematically hashed and written to the identity management blockchain to serve as a permanent/immutable proof-of-identity.

Figure 7:
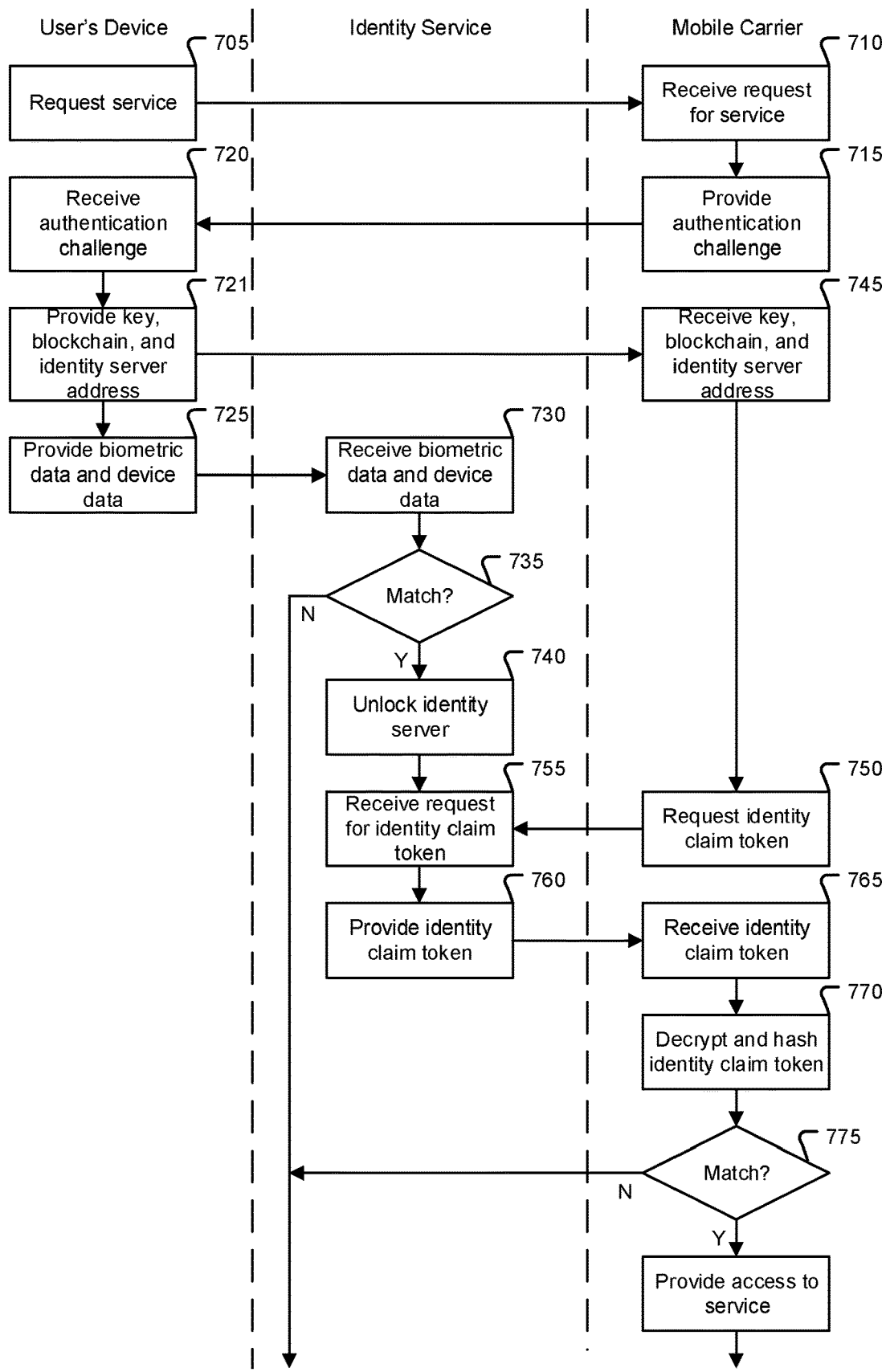
FIG. 7 is a flowchart illustrating an exemplary process for authenticating an identity according to one embodiment of the present disclosure.

FIG. 7 is a flowchart illustrating an exemplary process for authenticating an identity according to one embodiment of the present disclosure. As illustrated in this example, the process can begin by a user, through a user device, requesting 705 a service. The mobile carrier system can receive 710 the request for service from the device of the user and, in response, provide 715 to the device of the user an authentication challenge. The authentication challenge can comprise, for example, a request for some identifying information such as a username and password and/or other POI information.

The user device can receive 720 the authentication challenge from the mobile carrier system and can respond by providing 721 the identity management blockchain address, a symmetric key, and an address of the identity server. In some cases, the mobile device may also indicate a hashing algorithm to be used for generating a hash of identity claim tokens for the user. Additionally, the user device can provide 725 a biometric data sample and/or current device data to the identity server.

The identity server can receive 730, from the device of the user, the biometric data sample and current device data and make a determination 735 as to whether the received biometric data sample and current device data matches data in the set of baseline biometric data for the user and the device information stored in the identity record for the user. In response to determining 735 the received biometric data sample and current device data matches the data in the set of baseline biometric data for the user and the device information stored in the identity record for the user, the identity server can unlock the identity record for the user.

Meanwhile, the mobile carrier system can receive 745 from the device of the user, and in response to the authentication challenge, the identity management blockchain address, a symmetric key, and an address of the identity server. Using the address received from the device of the user, the mobile carrier system can request 750 or attempt to access the identity information for the user maintained by the identity server.

The identity server can in turn receive 755 the request for or attempted access of the identity information of the user from the mobile carrier system. If the identity record has been unlocked 740 as described above, the identity server can grant access to the mobile carrier system and provide 760 encrypted identity information for the user. The encrypted identity information can comprise one or more identity claims token for the user. According to one embodiment, the identity server can also generate an authentication score indicating a degree to which the received biometric data sample and current device data matches data in the set of baseline biometric data for the user and the device information stored in the identity record for the user and providing the authentication score in response to the request. In such cases, the generated authentication score can also be provided 760 to the mobile carrier system with the encrypted identity information.

The mobile carrier system can receive 765 the encrypted identity claim token for the user from the identity server. Using the symmetric key received from the device of the user, the mobile carrier system can then decrypt 770 the received encrypted identity claim token and generate a hash of the decrypted identity claim token. This hash can be generated using a hashing algorithm identified to the mobile service or other authenticating party, e.g., when the symmetric key, identity server address and identity management blockchain address are being shared. The mobile carrier system can the determine 775 whether the generated hash of the decrypted identity claim token matches the hash of the identity claim token for the user in the identity management blockchain. In response to the generated hash of the decrypted identity claim token matching the hash of the identity claim token for the user in the identity management blockchain, the mobile carrier system can provide 780 access to the requested service. The mobile carrier system may also receive the authentication score (if any) generated by the identity server. In such cases, the mobile carrier system can then apply one or more security policies defining a threshold value for the authentication score and provide 780 the requested service further based on a result of applying the one or more security policies.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those skilled in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for providing identity authentication, the method comprising:
    receiving a request to authenticate a user;
    in response to receiving the request, providing an address of an identity management blockchain, a symmetric key, and an address of an identity server;
    requesting and receiving, from the address of the identity server, an identity claim token for the user in an encrypted form;
    decrypting the received identity claim token in encrypted form using the symmetric key;
    generating a hash of the decrypted received identity claim token;
    determining whether the generated hash of the decrypted received identity claim token matches a hash of the identity claim token for the user in the identity management blockchain; and
    authenticating the user in response to the generated hash of the decrypted identity claim token matching the hash of the identity claim token for the user in the identity management blockchain.

2. The method of claim 1, further comprising:
    registering, by the identity server, Proof Of Identity (POI) information in an identity record for the user of a Rich Communications Services (RCS) network in a secure store and the hash of the identity claim token for the user in the identity management blockchain.

3. The method of claim 2, wherein registering the POI information in the identity record for the user further comprises:
    receiving, by the identity server from a device of the user, device information uniquely identifying the device of the user;
    receiving, by the identity server from the device of the user, Personally Identifiable Information (PII) for the user;
    storing, by the identity server, the device information and the PII for the user in the identity record for the user in an encrypted form;
    generating, by the identity server, the hash of the identity claim token for the user; and
    writing, by the identity server, the hash of the identity claim token for the user to the identity management blockchain.

4. The method of claim 2, further comprising obtaining, by the identity server, the identity claim token from a certification authority.

5. The method of claim 2, further comprising:
    receiving, by the identity server from a device of the user, a set of baseline biometric data for the user; and
    storing, by the identity server, the set of baseline biometric data for the user in an encrypted form.

6. The method of claim 5, wherein providing the identity claim token in the encrypted form further comprises:
    receiving, by the identity server from a device of the user, biometric data and device data;
    determining, by the identity server, whether the received biometric data and device data matches data in the set of baseline biometric data for the user and the device information stored in the identity record for the user; and
    in response to the received biometric data and device data matching the data in the set of baseline biometric data for the user and the device information stored in the identity record for the user, unlocking, by the identity server, the identity record for the user.

7. The method of claim 6, wherein providing, in response to the received request to authenticate the user, the identity claim token in the encrypted form further comprises generating an authentication score indicating a degree to which the received biometric data and device data matches the data in the set of baseline biometric data for the user and the device information stored in the identity record for the user and providing the authentication score in response to the request to authenticate the user.

8. A method for authenticating a user, the method comprising:

receiving, by a mobile carrier system from a device of the user, a request for a service;
providing, by the mobile carrier system to the device of the user, an authentication challenge in response to the request for the service;
receiving, by the mobile carrier system, from the device of the user, and in response to the authentication challenge, an address of an identity management blockchain, a symmetric key, and an address of an identity server;
requesting and receiving, by the mobile carrier system, from the address of the identity server, an identity claim token in an encrypted form for the user;
decrypting, by the mobile carrier system, the received identity claim token in encrypted form using the symmetric key received from the device of the user;
generating, by the mobile carrier system, a hash of the decrypted received identity claim token;
determining, by the mobile carrier system, whether the generated hash of the decrypted received identity claim token matches a hash of the identity claim token for the user in the identity management blockchain; and
providing, by the mobile carrier system, to the device of the user, the requested service in response to the generated hash of the decrypted received identity claim token matching the hash of the identity claim token for the user in the identity management blockchain.

9. The method of claim 8, further comprising:
receiving, by the mobile carrier system, from the identity server, an authentication score generated by the identity server based on a comparison of a current set of device information from the device of the user and current biometric information for the user to previously registered device information and biometric information; and
applying, by the mobile carrier system, one or more security policies defining a threshold value for the authentication score, wherein providing the requested service is further based on a result of applying the one or more security policies.

10. The method of claim 8, wherein the mobile carrier system comprises a system of a mobile carrier network, the device of the user comprises a mobile device, and the request for service comprises a request for Rich Communications Services (RCS) network access.

11. A system comprising:
an identity server comprising a processor and a memory coupled with and readable by the processor and storing therein a set of instructions which, when executed by the processor, causes the processor to provide identity authentication by:
registering Proof Of Identity (POI) information in an identity record for a user of a Rich Communications Services (RCS) network in a secure store and a hash of an identity claim token for the user in an identity management blockchain; and
a mobile carrier system comprising a processor and a memory coupled with and readable by the processor and storing therein a set of instructions which, when executed by the processor, causes the processor to authenticate the user when requesting services by:
receiving, from a device of the user, a request for a service, providing, to the device of the user, an authentication challenge in response to receiving the request for the service,
receiving, from the device of the user, and in response to the authentication challenge, an address of the identity management blockchain, a symmetric key, and an address of the identity server,
requesting from the address of the identity server, identity information for the user;
the instructions executed by the processor of the identity server further cause the processor to:
provide, to the mobile carrier system, in response to receiving the request for the service, an identity claim token for the user, wherein the identity claim token is in an encrypted form; and
the instructions executed by the processor of the mobile carrier system further cause the processor to:
receive, from the identity server, the identity claim token in the encrypted form in response to receiving the request for the service;
decrypt the received identity claim token in the encrypted form using the symmetric key received from the device of the user;
generate a hash of the decrypted received identity claim token;
determine whether the generated hash of the decrypted received identity claim token matches the hash of the identity claim token for the user in the identity management blockchain; and
provide to the device of the user, the requested service in response to the generated hash of the decrypted received identity claim token matching the hash of the identity claim token for the user in the identity management blockchain.

12. The system of claim 11, wherein registering the POI information in the identity record for the user further comprises:
receiving, from the device of the user, device information uniquely identifying the device of the user;
receiving, from the device of the user, the POI information for the user;
storing the device information and the POI information for the user in the identity record for the user in an encrypted form;
generating the hash of the identity claim token for the user; and
writing the hash of the identity claim token for the user to the identity management blockchain.

13. The system of claim 12, wherein the instructions executed by the processor of the identity server further cause the processor to obtain the identity claim token for the user from a certification authority.

14. The system of claim 12, wherein the instructions executed by the processor of the identity server further cause the processor to:
receive, from the device of the user, a set of baseline biometric data for the user; and
store the set of baseline biometric data for the user in an encrypted form.

15. The system of claim 14, wherein the instructions executed by the processor of the identity server further cause the processor to, prior to providing the identity claim token in encrypted form for the user to the mobile carrier system:
receive, from the device of the user, biometric data and device data;
determine whether the received biometric data and device data matches data in the set of baseline biometric data for the user and the device information stored in the identity record for the user; and
in response to the received biometric data and device data matching the data in the set of baseline biometric data for the user and the device information stored in the identity record for the user, unlock the identity record for the user.

16. The system of claim 15, wherein providing, in response to the received request, the identity claim token in encrypted form for the user further comprises generating an authentication score indicating a degree to which the received biometric data and device data matches the data in the set of baseline biometric data for the user and the device information stored in the identity record for the user and providing the authentication score in response to the request.

17. The system of claim 16, wherein the instructions executed by the processor of the mobile carrier system further cause the processor to:
   apply one or more security policies defining a threshold value for the authentication score, wherein providing the requested service is further based on a result of applying the one or more security policies.

18. The system of claim 11, wherein the mobile carrier system comprises a system of a mobile carrier network, the device of the user comprises a mobile device, and the request for service comprises a request for Rich Communications Services (RCS) network access.

* * * * *